United States Patent [19]

Bridges

[11] Patent Number: 5,029,720

[45] Date of Patent: Jul. 9, 1991

[54] COMBINED CUP AND HOLDER

[75] Inventor: John Bridges, Nashville, Tenn.

[73] Assignee: Aladdin Industries, Inc., Nashville, Tenn.

[21] Appl. No.: 393,633

[22] Filed: Aug. 14, 1989

[51] Int. Cl.⁵ .............................................. A47G 23/02
[52] U.S. Cl. ................................. 220/85 H; 248/310; 248/311.2; 224/281; 224/42.42; 220/85 K
[58] Field of Search .................. 220/85 H, 23.83, 636, 220/630, 85 K; 248/310, 311.2, 313, 314, 346.1; 224/281, 273, 42.42, 42.45 R

[56] References Cited

U.S. PATENT DOCUMENTS

| D. 258,795 | 4/1981 | Zamorski. | |
|---|---|---|---|
| D. 279,850 | 7/1985 | Brooker et al. . | |
| D. 289,955 | 5/1987 | Buist . | |
| D. 290,571 | 6/1987 | Rowe . | |
| 774,479 | 11/1904 | Lange . | |
| 1,103,065 | 7/1914 | Longyear | 248/310 |
| 3,033,404 | 5/1962 | Adell | 248/311.2 |
| 3,079,037 | 2/1963 | Schecter . | |
| 3,107,028 | 10/1963 | De Robertis | 220/85 H |
| 3,526,335 | 9/1970 | Swett et al. | 220/23.83 |
| 4,040,549 | 8/1977 | Sadler . | |
| 4,071,976 | 2/1978 | Chernewski | 248/313 |
| 4,127,211 | 11/1978 | Zerbey . | |
| 4,143,764 | 3/1979 | Moss | 220/85 H |
| 4,548,348 | 10/1985 | Clements | 220/85 H |
| 4,643,381 | 2/1987 | Levy . | |
| 4,724,986 | 2/1988 | Kahn | 224/273 |
| 4,733,900 | 3/1988 | Fluharty . | |
| 4,773,549 | 9/1988 | Avraham | 220/85 H |
| 4,883,205 | 11/1989 | Saelens et al. | 220/85 H |
| 4,919,381 | 4/1990 | Buist | 248/311.2 |

FOREIGN PATENT DOCUMENTS 457963  6/1950  Italy ............................... 220/23.83

Primary Examiner—Stephen Marcus
Assistant Examiner—S. Castellano
Attorney, Agent, or Firm—Sandler, Greenblum & Bernstein

[57] ABSTRACT

Cup holder for a cup, the holder having at least one recess on a side. The recess is partially surrounded by a projecting track which has a guiding head. A cup with a ring can be pushed substantially horizontally to the side and the ring is guided by the guiding bead until the cup reaches a point where it is free to drop into the corresponding recess. The cup holder can be used in a vehicle to minimize spillage.

7 Claims, 5 Drawing Sheets

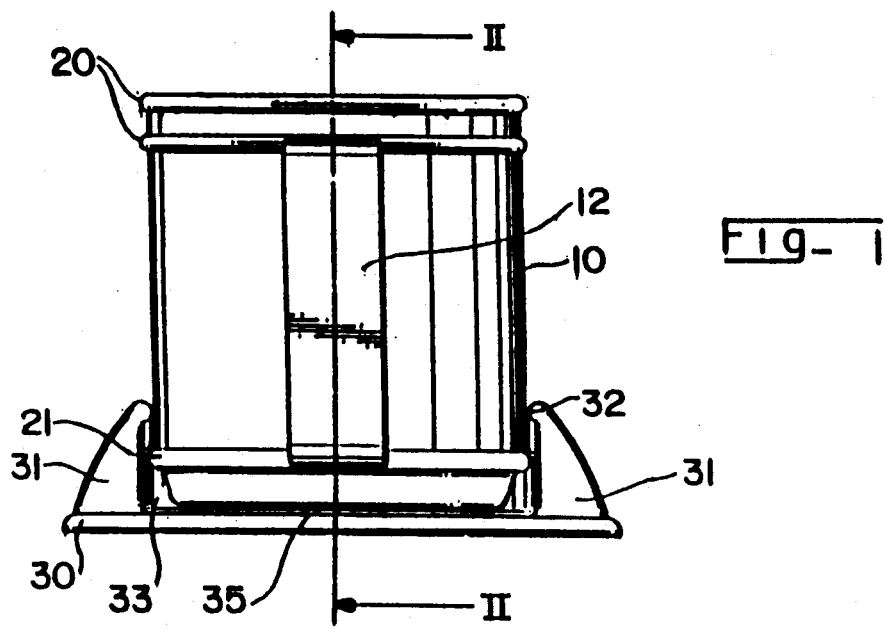
Fig-1
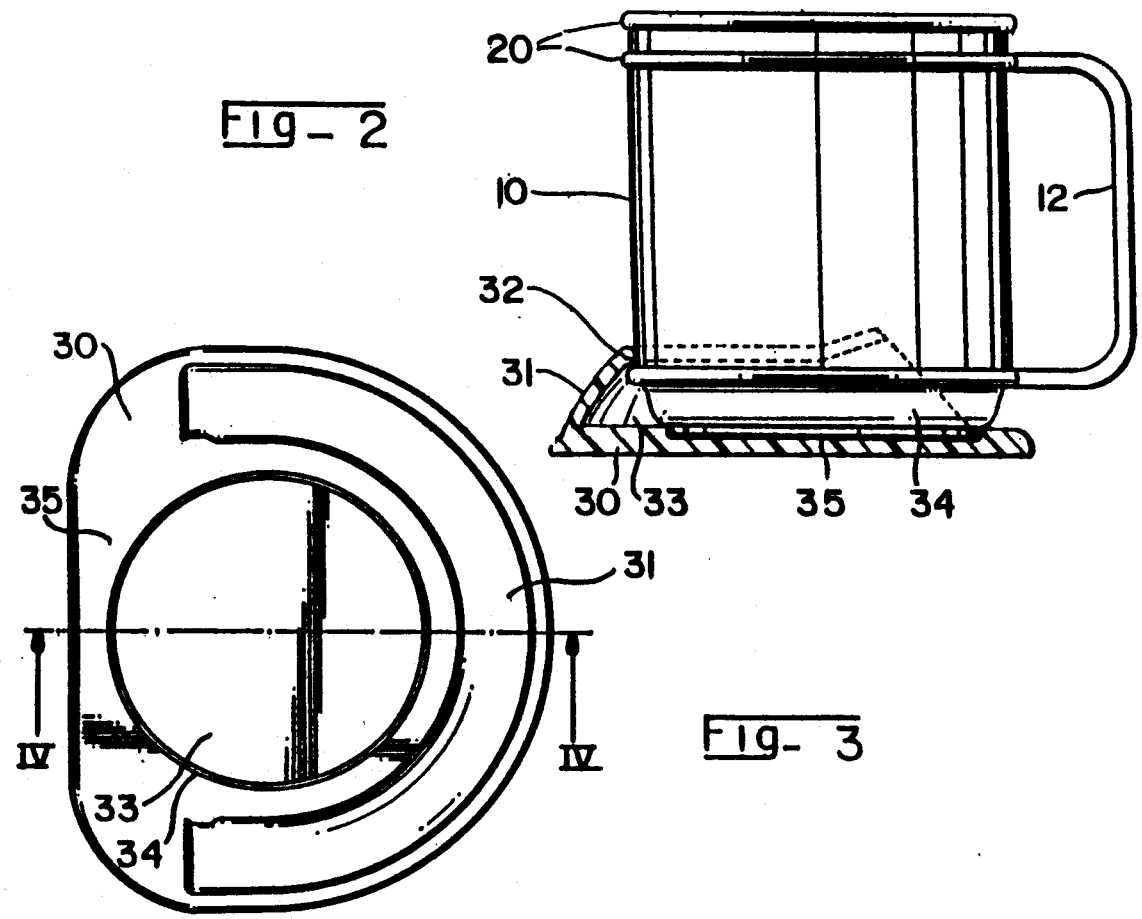
Fig-2
Fig-3

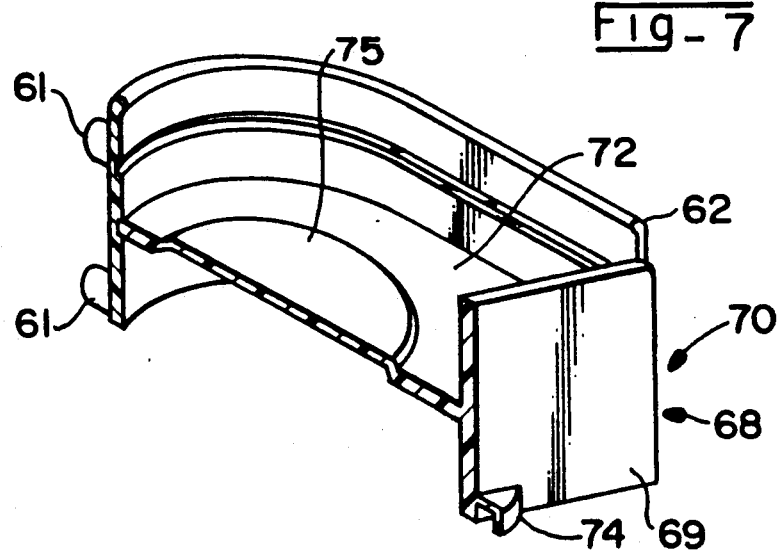
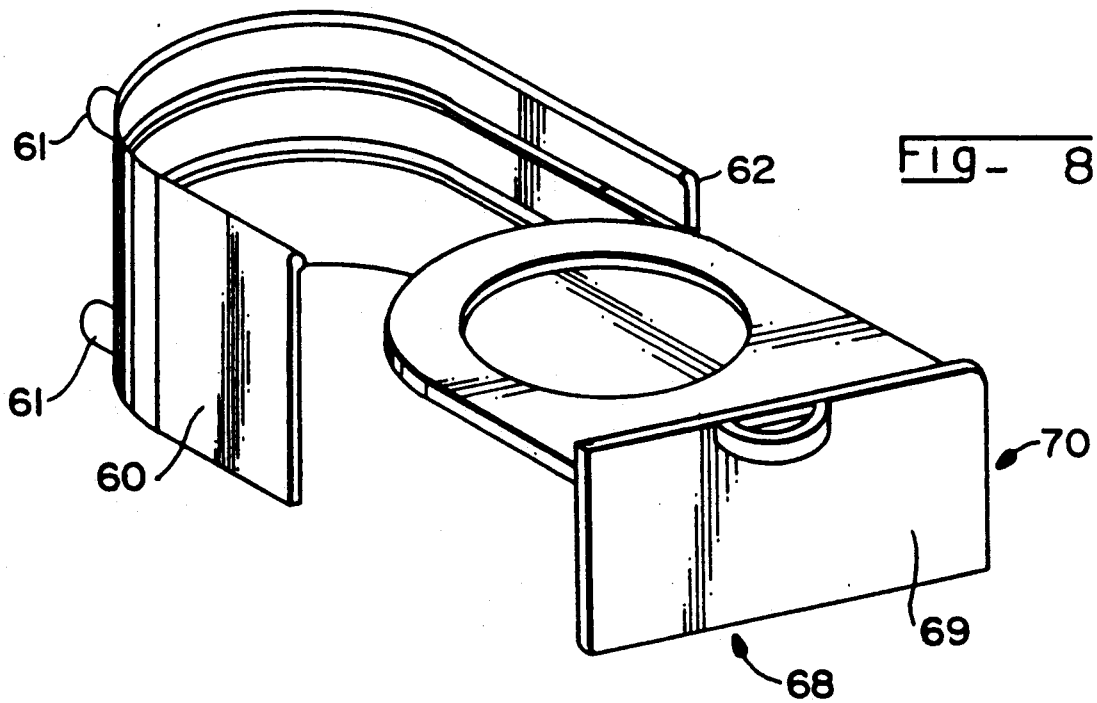

COMBINED CUP AND HOLDER

BACKGROUND OF THE INVENTION
REFERENCE TO RELATED APPLICATION

This application is related to Design Application Ser. No. 07/393,317, filed Aug. 14, 1989, entitled Mugs and Holders.

1. Field of the Invention

The present invention relates to a cup and holder combination which can be mounted in a vehicle in a manner such that spillage of the cup contents is minimized.

2. Background of the Invention

Spillage is a common problem encountered when the occupant of a moving vehicle positions a cup or the like on a surface of the vehicle. Spillage is particularly a problem during rapid acceleration and deceleration of the vehicle when the cup can easily tip over. Other motion such as turning and sudden starts and stops further aggravates the problem. The problem of spillage in moving vehicles is not confined to automobiles, and is likewise encountered in airplanes, boats, trains and the like.

A number of devices have previously been used and proposed to solve the spillage problem. Such devices generally have a means for securing the cup to a holder which is itself either attached to a portion of the vehicle or built in as part of the vehicle itself.

Brooker U.S. Pat. No. 279,852 discloses a cup and coaster base. The cup is slid into the coaster base. It would appear from the design patent that during insertion or removal, the cup is to be inclined, thus aggravating the possibility of accidental spillage during insertion. Likewise, during removal, it would appear that the cup must also be inclined thereby adding to the spillage problem.

U.S. Pat. No. 289,955 discloses a similar combination which, it would appear, suffers the same disadvantages as those of the BROOKER design patent.

U.S. Pat. No. 4,643,381 a removably mountable and selectably positionable dashboard tray for holding food, utensils, debris, having an aperture specially adapted for releasable retentive engagement to a foot holder for a footed cup or cup holder. As a result of frictional engagement with the top of the foot of the beverage container, the beverage container is retained in a continually upright position, particularly in a moving and vibrating vehicle. The foot holder has an angular upraised outer rim 52 spaced adjacent to the outer edge 62 of foot holder 35. Ear members 48 project inwardly from the top surface of the rim, and are substantially parallel to and spaced from the central base member 36. These ear members frictionally engage foot 24 of beverage container 14.

Each of the above devices appears to require that the cup be tilted as it is inserted and removed. Tilting of the cup obviously increases the chance and risk of spillage.

SUMMARY OF THE INVENTION

It is an object of the invention to provide an improved cup and holder combination for use in vehicles and the like which minimizes the risk of spillage.

It is further object of the invention to provide a cup and holder combination which permits insertion and removal of the cup without undue manipulation of the cup.

It is a further object of the invention to provide a cup and holder combination that decreases the chance of spillage upon insertion or removal of the cup.

According to the invention a cup holder for holding a cup in a vehicle is disclosed. The cup comprises at least one bead about an outer portion of the cup. The holder comprises a first side which includes at least one recess adapted to hold a closed bottom end of the cup. A track partially surrounds the recess, and has a guiding bead which is adapted to guide the ring on the outer portion of the cup whereby when the cup is pushed substantially horizontally on the first side of the holder the cup is guided by the bead on the track to where it drops into the recess.

The track projects upwardly from the one side and has an opening partially surrounding the at least one recess, and flared end portions.

Means may be provided in a fixed or removable fashion, or the holder may form an integral part of the vehicle.

The holder may have one or more recesses and corresponding tracks for receiving a corresponding number of cups.

The invention is further directed to the combination of the cup holder and the cup. As noted above, the holder has a first side on which is located at least one recess dimensioned to support a portion of the bottom of the cup. The recess is partially surrounded by a track which has a guiding bead and has an opening at a front portion thereof. The cup has at least one ring about an outer surface of the cup whereby when the cup is pushed through the track opening in a direction substantially horizontal to the first side, the cup is guided by the guiding bead on the track until a position is reached where the cup drops into the at least one recess of the cup holder.

According to yet another aspect, the invention is directed to a cup holder comprising an adapter that has a first side and a second side substantially parallel to the first side. The first side has a recess of a size that can hold the bottom of a cup. The adapter is detachably engaged within a bracket having a track extending above the first side and which is open towards the front of the adapter. The bracket includes a guiding bead partially surrounding the recess, whereby when a cup is pushed horizontally into the first side of the adapter the ring of the cup is guided by the guiding bead whereby the cup travels substantially parallel to the first side until the cup reaches a position where it drops into the recess.

Means are provided for sliding the adapter out of the bracket so that a second side of the holder may be placed in operative position to hold a cup. The means may include a tab.

The second side comprises a projection to support a cup. This projection may be the reverse side of the recess.

Means in the form of dowels may be provided to attach the holder to a mounting means in the vehicle.

The invention is also directed to a cup holder for holding cups in a vehicle having a side which includes plural recesses. Each of the recesses is adapted to support a cup. A corresponding track partially surrounds each of the recesses. Each of the tracks includes open portions in front of each of the recesses. Each track further includes a guiding bead such that when a cup which has a ring on its outer surface is pushed through the opening in one of the tracks, the track guides the cup for substantially parallel movement to the side until the cup is in a position to drop into the corresponding recess.

Most broadly the invention is directed to a cup holder having a first side with at least one recess therein. The track projects from the side and partially surrounds the at least one recess, the track including flared portions, whereby when a cup is pushed toward said recess, said track guides the cup in substantially parallel relation to said first side to a position where the cup will be free to drop into the at least one recess.

BRIEF DESCRIPTION OF THE DRAWINGS

FIG. 1 is a side elevational view of one embodiment of the cup-holder combination;

FIG. 2 is a side view of FIG. 1 showing the cup holder in cross-section;

FIG. 3 is a top view of the cup holder of FIG. 1 for a single cup;

FIG. 7 is a cross-section in part, of the cup holder of FIG. 6;

FIG. 8 illustrates, in perspective, the holder shown in FIG. 5, with an adapter slid out of its bracket;

DETAILED DESCRIPTION OF PREFERRED EMBODIMENTS

Figure 4:
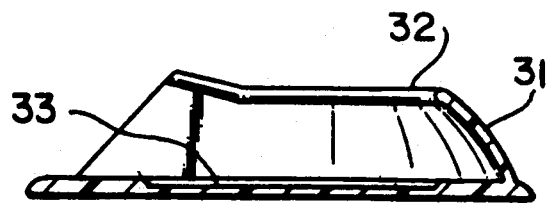
FIG. 4 is a cross-section of FIG. 3 along line IV—IV.

Referring to FIG. 1, cup 10 has at least one ring 21. For styling reasons, the cup 10 may have more than one ring, such as rings 20. As illustrated in FIGS. 1 and 2, rings 20 and 21 may be integral with handle 12 of cup 10. The cup can be of a single wall construction or be of the insulated type having plural walls. Holder 30 has a generally circular track 31 having guiding bead 32 on the inside surface of the track and a recess. The size of the cup is, of course, immaterial, it being necessary only that the track and bead be positioned relative to one another to allow the track to guide the ring during the horizontal movement of the cup to its final position. The cup as well as the holder can be of plastic or any other appropriate material.

As can be best seen in FIGS. 2-4, track 31 of holder 30, is open and and flared upwardly at one end 34 and holder 30 has a recess 33, on side 35, which is adapted to hold the bottom portion of the cup after it has been slid horizontally to a sufficient extent into the holder. The depth of recess 33 is sized and shaped to receive a matching protruding bottom portion of a cup and can be as small as one-sixteenth of an inch or greater in depth. Track 31 projects upwardly (FIGS. 2 and 4) and inwardly (FIG. 3) surrounds recess (FIG. 3) and from an edge of side 35.

As can be clearly seen in FIG. 2, when finally positioned, cup 10 rests in recess 33. To insert the cup in the holder, the user pushes cup 10 substantially parallel to a top side 35 of the holder. Track 31 and guiding bead 32 on the track guides the ring of the cup. The cup with its ring 21 is pushed towards the rear while the upper part of ring 21 is in contact with the lower part of bead 32. When the cup ring reaches the vicinity of the rear surface of the track, the bottom of the cup is positioned over the recess and the cup is free to, so that the upper surface of ring 21 is spaced from the lower surface of bead 32 by a distance substantially equal to the depth of the recess, as shown in FIGS. 1 and 2 drop into recess 33. With the cup in the recess the cup is stabilized and spillage of the contents due to motion of the vehicle is minimized because the cup can tip slightly until the ring contacts the bead.

The track may be constructed with front portions that are flared as seen on the right side in FIG. 2 and the left side of FIG. 4. The flared construction facilitates the guidance by track 31. When the user first pushes the cup to be guided by track 31, the flared up portion acts to facilitate guidance of the cup. But for the flared portion, the cup might accidentally bump the front edge of the track upon initial insertion, or jump over the top of the holder.

To remove the cup, the user simply lifts the rear of the cup vertically, until the lower portion of the cup nearest the handle clears the recess. The cup is then slid horizontally out of the holder through opening 34 on side 35.

Although only one track has been shown in FIGS. 1-4, it is fully within the scope of the invention that plural tracks can be provided on the top side of the holder.

Figure 12:
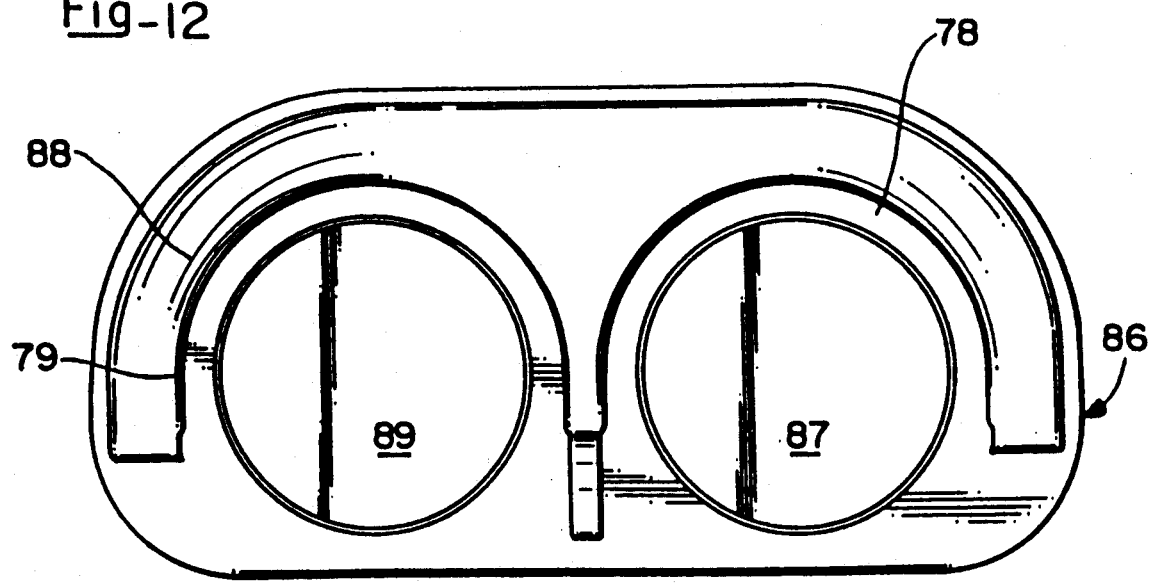
FIG. 12 is a top view of a holder with two tracks and recesses.

In FIG. 12, an example of plural tracks on one side 78 is shown. Two recesses, 87 and 89 are provided on one surface of holder 86. Tracks 88 partially surround both recesses, each inner surface of each track having a guiding bead 79 that is adapted to guide a corresponding ring on a cup. With two recesses, of either the same or different sizes on the holder, two cups can be held in the holder at the same time. While two recesses have been shown, more than two recesses can be placed on a single surface. With plural recesses on the surface, plural cups can be held at the same time.

The operation of the holder with more than one recess on a side is the same as with a holder with a single recess.

The holder itself can be an integral part of a vehicle or be fixedly attached to the vehicle. The holder can be fixedly attached to the vehicle by mechanical means, adhesive means or Velcro.

Figure 5:
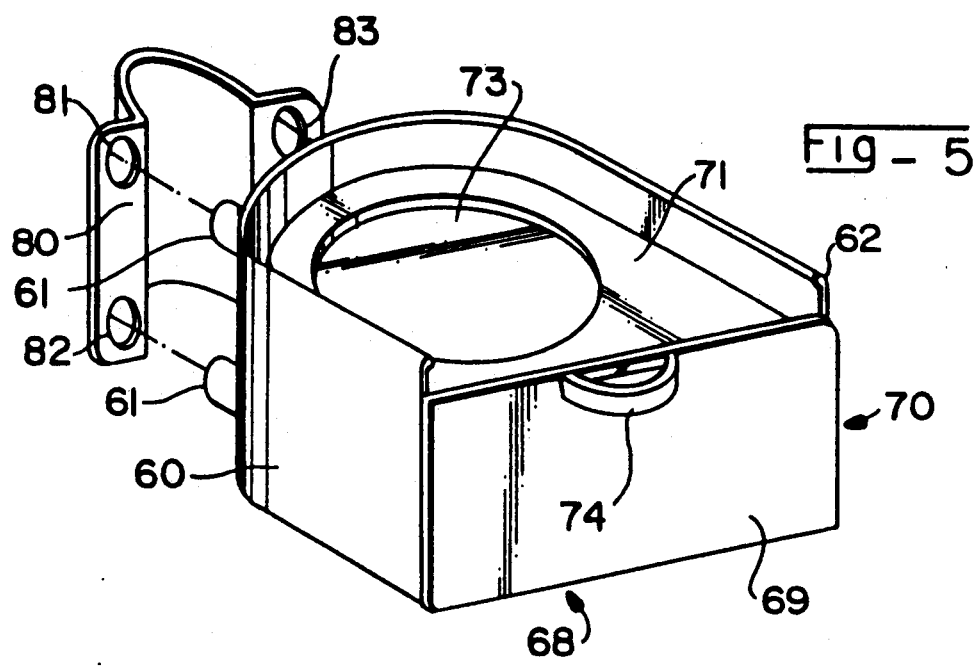
FIG. 5 is a perspective view of a revisible cup holder with one surface exposed for use.
Figure 6:
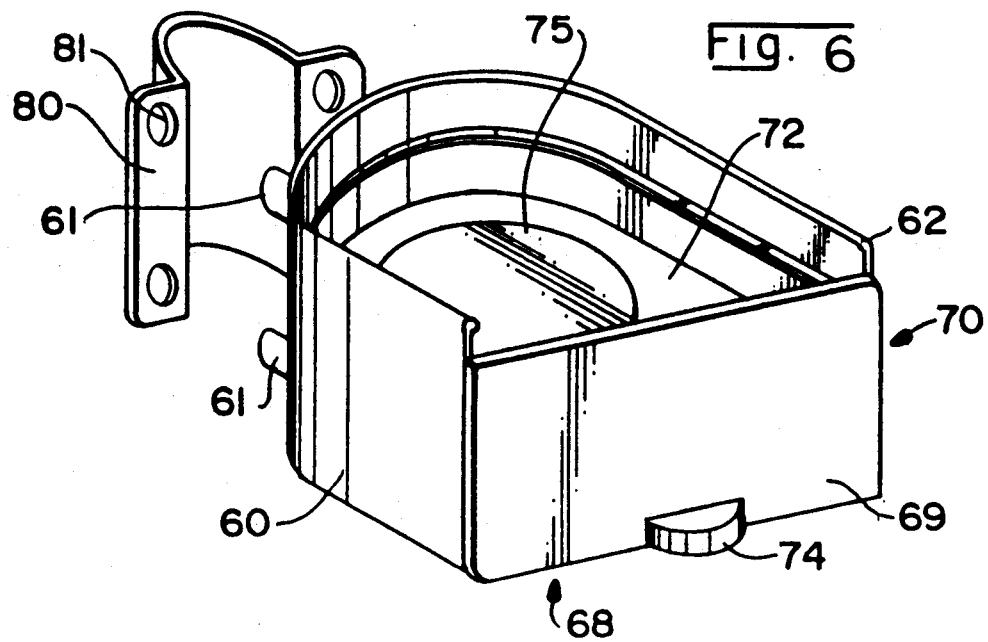
FIG. 6 is a perspective view of the holder of FIG. 5 with an opposite holder side exposed for use.
Figure 9:
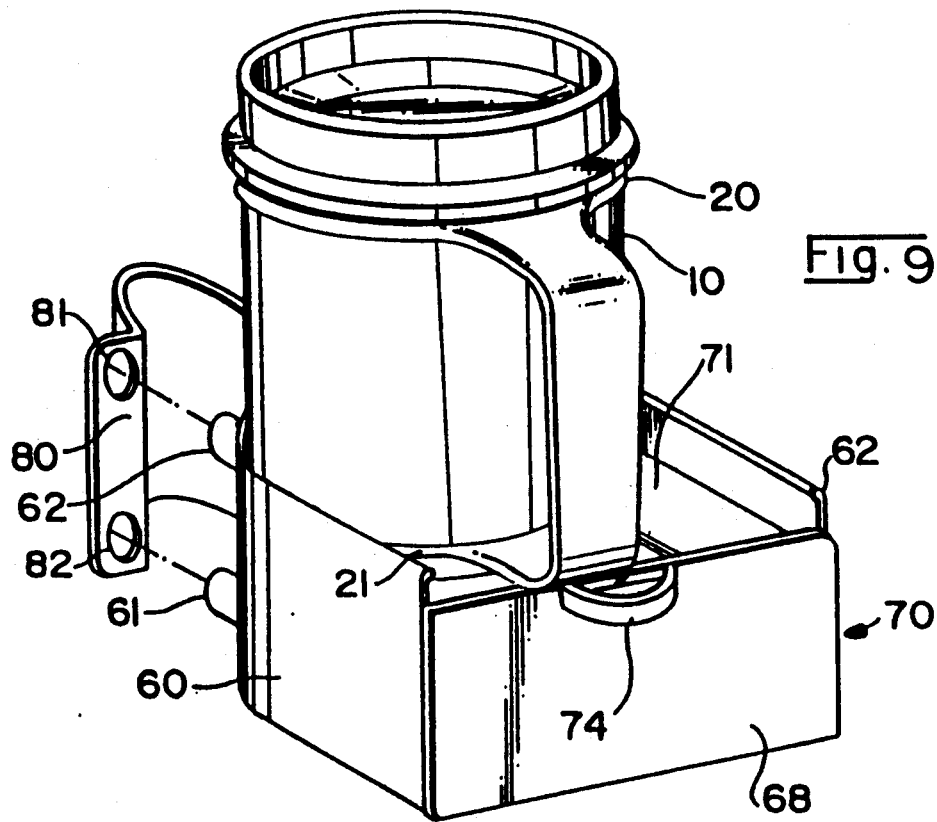
FIG. 9 is a perspective view of the holder with an adapter in the position of FIG. 5 with a cup in the holder.

Another embodiment of the invention is shown in FIG. 5 where holder 70 is shown with an adapter 68 that has a top side 71 with a recess operating in substantially the same manner as described in FIGS. 1-4 and 12. Holder 70 has two sides 71 (FIG. 5), and 72 (FIG. 6). In FIGS. 5 and 9 when recess 73 is exposed, guiding bead 62 on bracket 60 functions in substantially the same manner as guiding bead 32 in FIGS. 1, 2, 3 and 4, to guide a cup to where it can drop into recess 73.

Bracket 68, as best seen in FIGS. 7 and 8, has a wall 69. Wall 69 has tab 74 to facilitate sliding adapter 68 in and out of bracket 60.

Bracket 60 extends above side 71 and the extension of the bracket acts as a track. Bracket 60 has a guiding bead 62. Holder 70 is secured to mounting fixture 80 by the use of dowels 61. Mounting fixture has holes 81, 82 and 83 to engage the dowels. The number of dowels and holes, of course, is immaterial, it being only necessary to use a sufficient number to properly support holder 70. Other means could also be used to affix the holder, such as mechanical means, adhesive means or Velcro.

To insert the cup in the holder 70, shown in FIG. 5, the user pushes a cup through an opening in bracket 60 in the front. A cup with a ring will be guided by the guiding bead 62 of bracket 60 for substantially horizontal travel relative to side 71. The cup with its ring is pushed toward the rear while the upper part of the ring is in contact with the lower part of bead 62. When the cup reaches the vicinity of the track surface of the bracket 60 that faces the recess, the cup is free to drop into recess 73. The operation of the holder shown in FIG. 5 is similar to the operation of the holder shown in FIGS. 1–4. As more clearly seen in FIG. 9, cup 10 is in operative combination with holder 70 and rests in recess 73.

To use an opposite side of holder 70, from that shown in FIG. 5, the user pulls on tab 74 and slides adapter 68 out of bracket 60 (FIG. 8). After adapter 68 of the holder 70 has been slid out of bracket 60, adapter 68 is turned over and slid back into bracket 60, holder 70 then has side 72 in an exposed top position. With side 72 on top, as shown in FIG. 6 the holder can support a cup, for example, of the type used in a fast food restaurant.

To use holder side 72, the user lowers a cup substantially perpendicular to the side 72. The cup will rest on 75, which is a raised projection of opposite 73 (FIG. 7). The cup will also be supported by the upper portion of the bracket 60.

To remove the cup from side 72 (FIG. 6), the user simply lifts the cup out of engagement with holder 70. There is no sliding of the cup as in the position shown in FIG. 5. The advantage of the two sided holder of FIGS. 5 and 6, is that the user can quickly convert the holder to hold a plurality of different types of cups, as the particular need arises.

While holder 70 shown in FIGS. 5–7 can be fixedly mounted to the vehicle, holder 70 could be an integral part of the vehicle. For example, holder 70 could be made an integral part of the vehicle during the manufacture of the vehicle.

Figure 10:
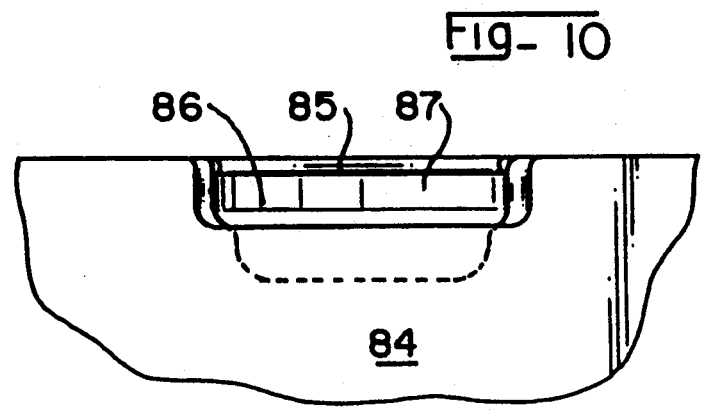
FIG. 10 is a cross section of a holder shown combined with a vehicle dash.

FIG. 10 shows holder 87, guiding bead 85 and recess 86. Holder 87 is shown built into dash 84 of a vehicle and is an integral part of the dash and vehicle.

As shown in FIG. 10, it is possible to retain conventional fast food cups as well as mugs with the special locking feature already described. The use of fast food cups is possible because of recess 91 immediately beneath the recess of the cup which contains the fast food cups without effecting the use of the holder for mugs having the locking feature.

The location of the holder on the dash could be in the central part of the dash, so that either the driver or passenger could use the holder. Of course, plural holders could be placed on the dash, the particular location and number of holders being chosen dependent on ultimate use of the holders. It is understood that the holder would be placed in a position on the dash so the view of the driver would not be obstructed by the holder.

Figure 11:
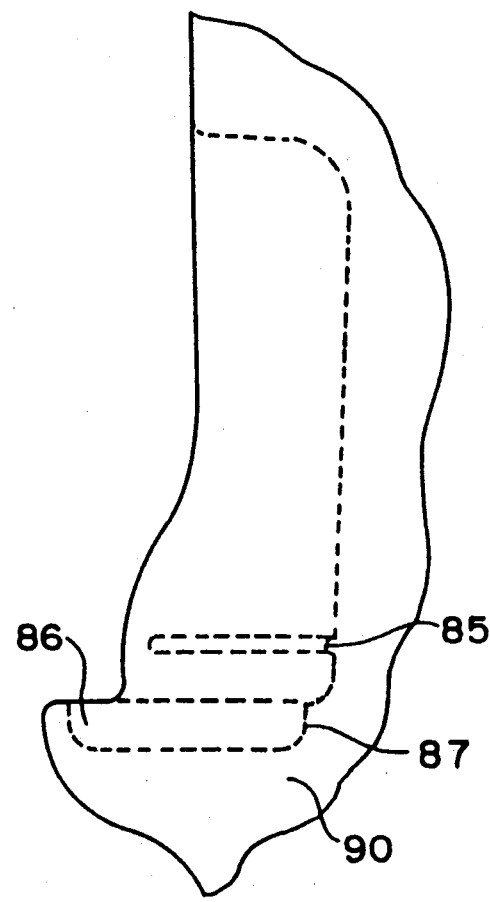
FIG. 11 is a cross section of a holder shown combined with a vehicle door or vertical wall.

FIG. 11 shows a holder having the same element numerals as in FIG. 10 embedded within door or wall 90 of a vehicle. As explained with respect to FIG. 10, holder 87 can be an integral part of the vehicle dash or console or else be affixedly attached to the dash or console.

While the holder has been described as being on the dash or door of a vehicle, it is fully within the scope of the invention that holders be placed at any convenient location in or about the vehicle.

In the embodiment of the cups shown and described, it is understood that the cups often have lids. The lids can be mounted inside the cups or over an outer rim of the cup. The lids may be provided with means such as a tab, so that the lid can be easily removed from the cup.

Although the invention has been described with reference to particular means, materials, and embodiments, it is to be understood that the invention is not limited to the particulars disclosed, and extends to all equivalents within the scope of the claims.

We claim:

1. A cup holder for holding a cup in a vehicle, the cup comprising at least one ring on an outer portion of the cup, the holder comprising a first side which includes at least one recess adapted to hold a closed bottom end of the cup, a track partially surrounding the recess, said track having a guiding bead having a lower surface which is adapted to guide an upper surface of the ring on the outer portion of the cup, whereby when the cup is pushed substantially horizontally on said first side of the holder, the cup is guided by the bead on the track to where it drops into the recess, said lower surface of said guiding bead being thereby spaced from said upper surface of said ring by a distance substantially equal to the depth of said recess.

2. The cup holder of claim 1, wherein the track projects upwardly from said first side and said track partially surrounding said at least one recess.

3. The cup holder of claim 2, wherein said track has flared end portions.

4. The cup holder of claim 3, wherein said track is spaced inwardly from an edge of said first side.

5. The cup holder of claim 1, wherein said cup holder is used in a vehicle.

6. The cup holder of claim 1 wherein, there is a single recess on said first side of the holder.

7. A cup holder for a cup, said holder having a first side with at least one recess therein, a track projecting from said side and partially surrounding said at least one recess, the track including flared portions, whereby when the cup is pushed toward said recess, said track contacts a portion of the cup to guide the cup in substantially parallel relation to said first side to a position where the cup will be free to drop into the at least one recess, the portion of the cup being spaced from said track by a distance substantially equal to the depth of said recess, when the cup is in said recess.

* * * * *

UNITED STATES PATENT AND TRADEMARK OFFICE
CERTIFICATE OF CORRECTION

PATENT NO. : 5,029,720

DATED : July 9, 1991

INVENTOR(S) : J. BRIDGES

It is certified that error appears in the above-identified patent and that said Letters Patent is hereby corrected as shown below:

At column 1, line 65, after "is" insert ---a---.
    At column 2, line 13, change "holder the" to ---holder. The---.
    At column 2, line 33, change "side, the" to ---side. The---.
    At column 2, line 46, change "adapter the" to ---adapter. The---.
    At column 3, line 32, change "cross section" to ---cross-section---.
    At column 3, line 34, change "cross section" to ---cross-section---.
    At column 3, line 63, after "31" insert ---surrounds recess 33 (Fig. 3) and---.
    At column 3, line 64, delete ---surrounds recess (Fig. 3) and ---.
    At column 4, line 7, change "to," to ---to drop,---.
    At column 4, line 10, change "2 drop" to ---2,---.
    At column 5, line 35, change "two sided" to ---two-sided---.

UNITED STATES PATENT AND TRADEMARK OFFICE
CERTIFICATE OF CORRECTION

PATENT NO. : 5,029,720
DATED : July 9, 1991
INVENTOR(S) : J. Bridges

It is certified that error appears in the above-identified patent and that said Letters Patent is hereby corrected as shown below:

At column 5, line 53, change "effecting" to --affecting--.

Signed and Sealed this

Twenty-fifth Day of May, 1993

Attest:

MICHAEL K. KIRK

Attesting Officer     Acting Commissioner of Patents and Trademarks